US006248996B1

(12) United States Patent
Johnson et al.

(10) Patent No.: US 6,248,996 B1
(45) Date of Patent: Jun. 19, 2001

(54) SINGLE-SCAN TRANSMISSION OF DOCUMENTS TO MULTIPLE HETEROGENEOUS RECEIVERS

(75) Inventors: Stephen K. Johnson, Meridian; Warren J. Greaves, Boise, both of ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/351,931

(22) Filed: Jul. 12, 1999

(51) Int. Cl.[7] ............................... H01J 3/14; H04N 1/00
(52) U.S. Cl. .................. 250/234; 250/208.1; 395/200.3; 358/400; 358/468
(58) Field of Search ................................ 250/234, 235, 250/556, 566, 208.1, 578, 271; 395/200.61, 200.3; 709/200, 203, 213; 358/400, 468

(56) References Cited

U.S. PATENT DOCUMENTS

| 4,675,745 | * | 6/1987 | Suzuki .............................. 250/578 |
| 5,134,669 | * | 7/1992 | Keogh et al. ..................... 250/271 |
| 5,159,187 | * | 10/1992 | Okisu et al. .................... 250/208.1 |
| 5,602,993 | * | 2/1997 | Stromberg ....................... 395/200.1 |
| 5,949,978 | * | 9/1999 | Kondo et al. .................. 395/200.61 |
| 6,119,142 | * | 9/2000 | Kosaka ............................... 709/200 |

* cited by examiner

Primary Examiner—Frank G. Font
Assistant Examiner—Roy M. Punnoose

(57) ABSTRACT

A method for transmitting data contained in a document between a scanning device and a plurality of heterogeneous receiver destinations, each respective receiver destination being capable of receiving scanned information in a specific data form, is set forth. In a first step, a plurality of heterogeneous receiver destinations are selected. Next, an acceptable data form for each receiver destination is determined. The document is then scanned once to convert the document into electronic data. The electronic data is then used to create a respective electronic data file for each receiver destination, each file converted to a data form appropriate to its corresponding receiver destination. The electronic data files are then transmitted to their respective receiver destinations. In a system including a scanning device connected to at least one receiver capable of receiving scanned information as electronic files, a scanning device transmission arrangement is also set forth. The arrangement includes a processor for storing, retrieving, and selecting a plurality of heterogeneous receiver destinations. A scanning device is provided for converting the document into electronic data. Also included is a communication device for establishing contact with a selected plurality of heterogeneous receiver destinations and for transmitting data created from a scanned document to the selected plurality of heterogeneous receiver destinations simultaneously.

20 Claims, 3 Drawing Sheets

SINGLE-SCAN TRANSMISSION OF DOCUMENTS TO MULTIPLE HETEROGENEOUS RECEIVERS

FIELD OF THE INVENTION

The present invention relates generally to transmitting data to multiple receivers. Specifically, the present invention relates to a method and apparatus for transmitting scanned data to multiple heterogeneous receivers.

BACKGROUND OF THE INVENTION

A useful feature provided on some scanners enables a user electronically to send a scanned document to a specific receiver destination. Communications protocols such as Hewlett-Packard's JetSend™ technology can be employed to make such communication possible. JetSend™ acts as on-board "intelligence," allowing various devices to communicate directly with other JetSend™ -enabled devices. The JetSend™ technology resides in device firmware or PC software. It allows two devices to connect, negotiate data types, provide status updates about device operation and exchange information without user intervention. The Jet-Send™ protocol can be built into any information appliance, regardless of device function.

Network scanner and printer combinations are designed to increase productivity and reduce cost. Working together, the two devices can eliminate the time spent waiting to use a busy fax machine or for interoffice mail to arrive, and they can reduce the use of expensive delivery services to send and receive paper-based information.

JetSend™ technology is available on scanning devices such as the HP Network ScanJet 5™ scanner. The Network ScanJet 5™ has the ability to send information directly to a JetSend™ -enabled receiving device anywhere in the world. To send information, the scanner communicates with the receiving device, and the two devices then negotiate their capabilities. Information is sent and then printed or displayed, depending on the type of receiving device. The information is exchanged between the two devices directly, without user intervention. The devices themselves determine the best-possible outcome. The network scanner's easy-to-use interface contributes to the simple and efficient Jet-Send™ communication process. From the front control panel of the scanner, the user enters the address of the receiving device and scans the document at a rate of 15 pages per minute. By pushing the green "go" button, information is sent directly to a JetSend™-enabled receiving device.

Another JetSend™ -enabled device is the HP 9100C Digital Sender™. The 9100C Digital Sender™ is a workgroup-communication device that converts paper documents into digital form. Documents can be sent directly from the HP 9100C Digital Sender™ device to any e-mail address, network fax, HP JetSend™ -enabled device, network printer or personal computer. The HP 9100C Digital Sender™ -enables users to easily integrate and distribute paper-based documents into the electronic workplace.

The HP 9100C Digital Sender™ includes an interface having a computer-like keyboard which allows users to manually enter receiving device information at the device. Similar to sending e-mail from a PC, the HP 9100C Digital Sender™ enables users to type e-mail addresses or to queue personalized e-mail addresses or distribution lists from a customized address book, allowing users to send paper-based documents as e-mail messages, in color or monochrome. By leveraging the global Internet e-mail infrastructure, the HP 9100C Digital Sender™ is an efficient and cost-effective alternative to such typical paper distribution methods as fax and courier.

One limitation of devices such as the Network ScanJet 5™ and the 9100C Digital Sender™ is in the transmission of individual files to multiple heterogeneous receivers. With these devices, the respective receiver destinations sometimes require different data formats. For example, a fax machine may expect 300 dots-per-inch (dpi) single bit-per-pixel (bpp) data, while a printer may be capable of 600-dpi single bpp data, and a PC may want 300-dpi 8-bpp data. In such instances, the original document must be scanned separately for each receiver destination. If a user wants to send a document to a printer, a fax machine, and an e-mail address, the user scans and sends the document three separate times. Furthermore, no new transmission can begin until the previous transmission has been completed.

If the user has even a few destinations for one document, the process of serially re-scanning and re-transmitting for each destination can be cumbersome and time consuming. This is especially true for multi-page documents, since each page of the document would have to be scanned for each receiver destination. Therefore, the need exists to provide a more user-friendly scanner that simplifies the task of sending a job to one or more heterogeneous receivers for the user.

SUMMARY OF THE INVENTION

A method for transmitting data contained in a document between a scanning device and a plurality of heterogeneous receiver destinations, each respective receiver destination being capable of receiving scanned information in a specific data form, is set forth. In a first step, a plurality of heterogeneous receiver destinations are selected. Next, an acceptable data form for each receiver destination is determined. The document is then scanned once to convert the document into electronic data. The electronic data is then used to create a respective electronic data file for each receiver destination, each file converted to a data form appropriate to its corresponding receiver destination. The electronic data files are then transmitted to their respective receiver destinations.

The step of using the electronic data can include the step of creating a buffer as an intermediate step in creating the respective data files. A job number can be assigned to each receiver destination selected, and the transmission status for each of the job numbers can be displayed.

The scanner can communicate with each receiver destination to determine the type and availability of each receiver destination. The receiver destinations can be of at least two types chosen from a group consisting of a host workstation, a fax machine, a server, an e-mail server, a printer, or any JetSend™ -enabled receiver device.

The step of scanning can be accomplished by dividing the document into a plurality of strips, and scanning the strips sequentially. A buffer file can be created to receive scanned data for each file type as each strip is scanned. The buffer files can be used to create electronic data files after the scanning step is completed.

The step of converting can include converting the document into a plurality of electronic data files having different resolutions.

The method can further include the step of displaying transmission status during the step of transmitting. Each job number can be queried at regular intervals to obtain updated status information while transmitting the files as electronic data to the selected receiver destinations. Updated transmission status of the electronic file can be displayed while transmitting the electronic file to the selected receiver destinations.

A memory device can be provided in the scanning device. The memory device can contain a plurality receiver destination addresses. A list of the receiver destination addresses stored in the memory device can be displayed, from which a plurality of heterogeneous receiver destinations can be selected.

In a system including a scanning device connected to at least one receiver capable of receiving scanned information as electronic files, a scanning device transmission arrangement is also set forth. The arrangement includes a processor for storing, retrieving, and selecting a plurality of heterogeneous receiver destinations. A scanning device is provided for converting the document into electronic data. Also included is a communication device for establishing contact with a selected plurality of heterogeneous receiver destinations and for transmitting data created from a scanned document to the selected plurality of heterogeneous receiver destinations simultaneously.

A display can be provided for displaying system status information. Receiver destination addresses can be entered into the processor means via an input device. The processor can include a tracking mechanism for assigning a job number to each receiver destination address, and an archive for storing job log information.

DETAILED DESCRIPTION OF THE INVENTION

Figure 1:
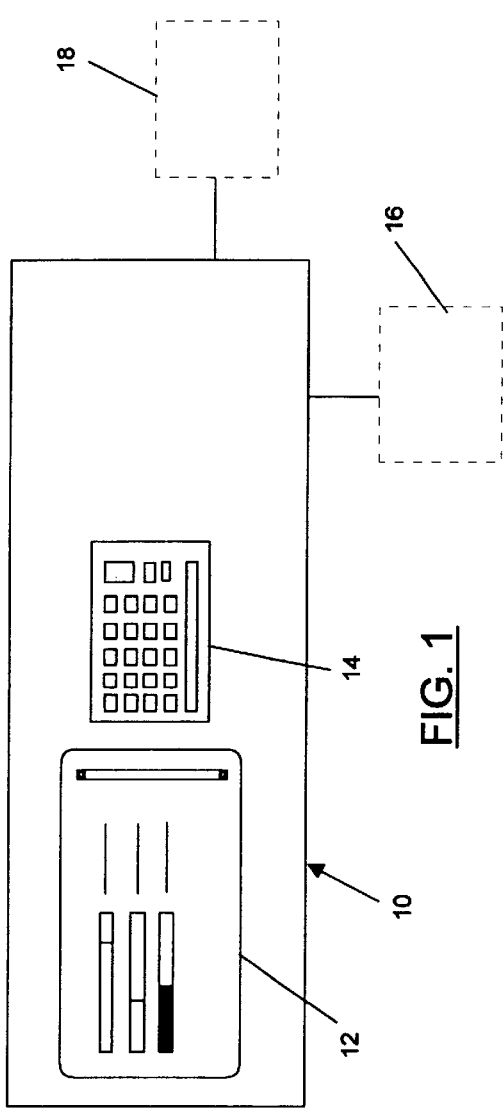
FIG. 1 illustrates a scanner constructed in accordance with the principles discussed herein.

As illustrated in FIG. 1, a scanner is shown generally at 10. The scanner 10 includes a suitable display 12. The display 12 can be provided as a touchscreen, such as a model number 900288-1003 touchscreen display manufactured by Three-Five Systems, Inc. The operation of the touchscreen display is discussed in co-pending application Ser. No. 09/351,932, filed concurrently herewith.

A keypad 14 can be provided to allow the user to select functions, such as scan, cancel, and enter destination addresses, such as IP addresses, fax numbers, a workstation address, or a printer address. The keypad 14 can be electrically connected to the display 12 via an internal or associated CPU 16. The CPU 16 used in conjunction with the present invention can reside physically in the scanner 10, or in a device 18 associated with the scanner 10. For example, where the scanner 10 is provided in combination with a printer, the associated CPU 16 of the printer can be connected to the display 12. For a stand-alone scanner, the CPU 16 can be provided internally. The CPU 16 can include an arrangement for updating the display 12, such as a query loop. The CPU 16 can further include an arrangement for assigning a job number to each destination address selected. Further, the CPU 16 can store or archive job log information.

Figure 2:
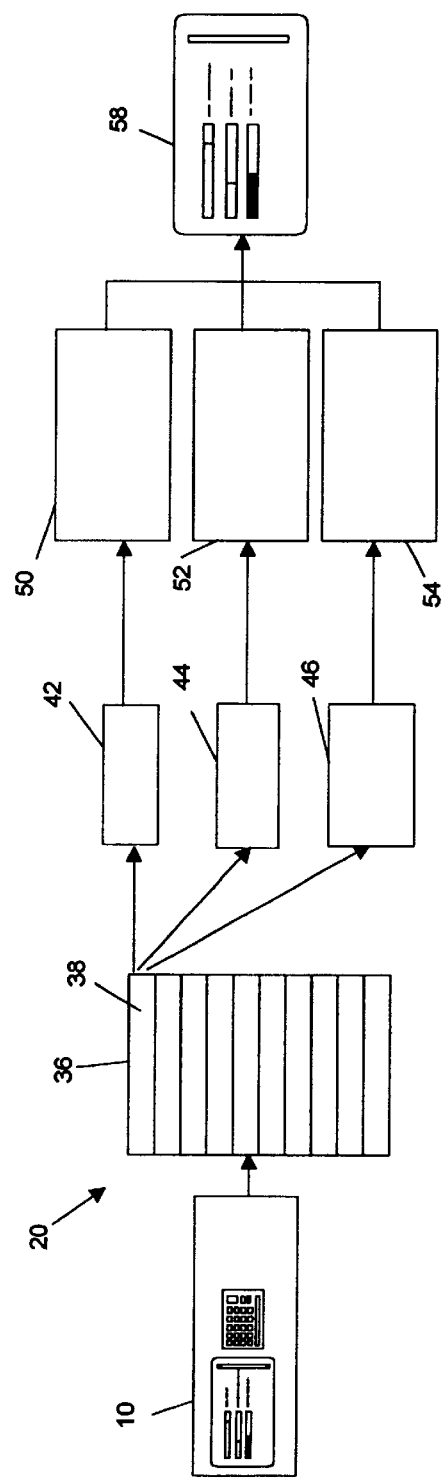
FIG. 2 is a schematic diagram illustrating a method in accordance with the principles discussed herein.
Figure 3:
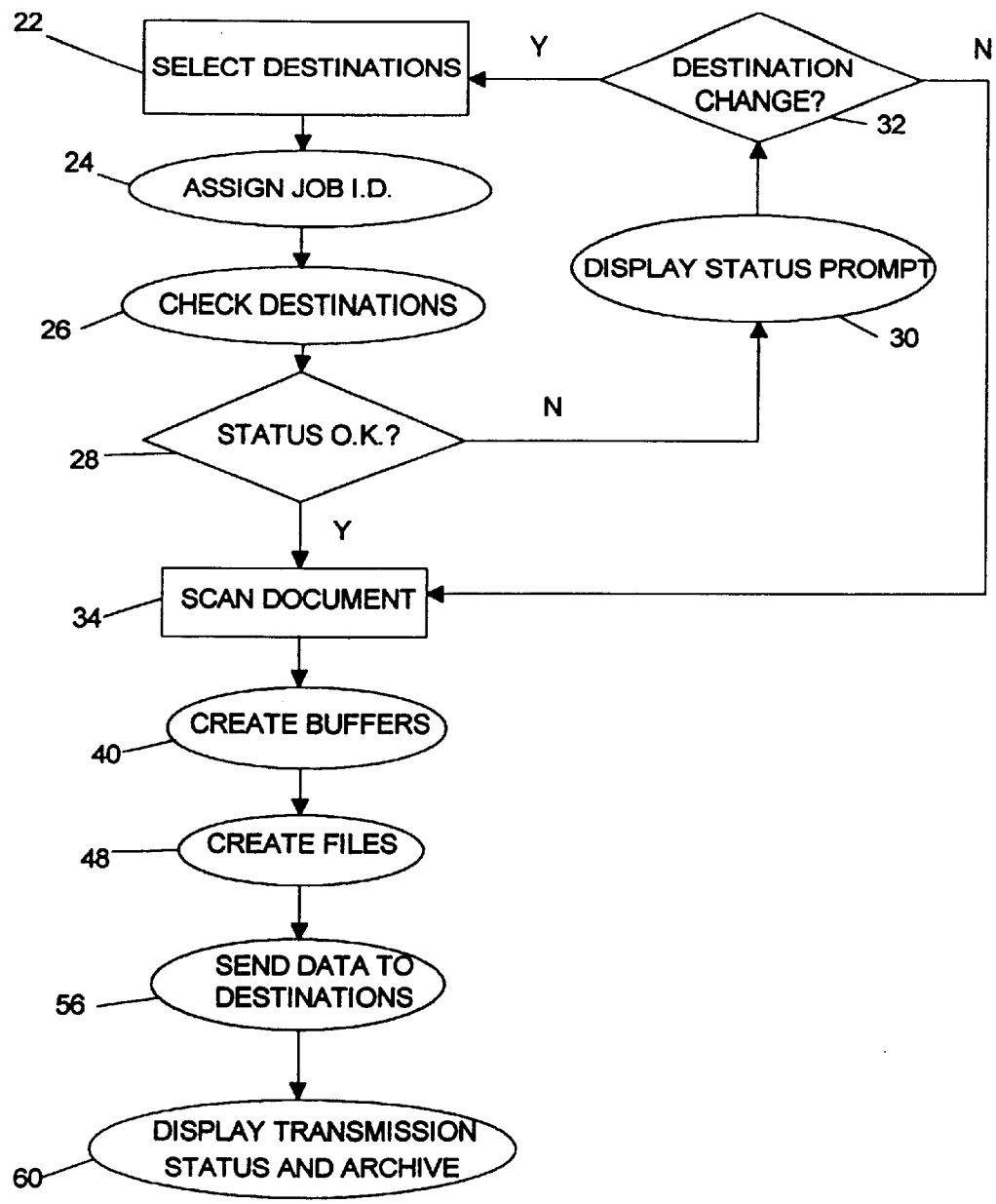
FIG. 3 is a flow chart illustrating a method in accordance with the principles discussed herein.

FIGS. 2 and 3 schematically illustrate an exemplary method 20 of the principles of the present invention. First, the scanning device 10 (FIG. 2) is used to select a plurality of receiver destination addresses, as shown at point 22 (FIG. 3). The destination addresses can be stored within the scanning device, imported from a PC or system administrator, or entered manually by the user. A user can also select addresses from a distribution list by, for example, scrolling down to a desired destination, highlighting the desired destination, and selecting an appropriate screen interface function button provided on a control panel of the apparatus, such as an ADD button.

Next, a job number, or id., is assigned to each destination address selected at 24 (FIG. 3). Connections are then made between the scanning device and the destination addresses at point 26 (FIG. 3) to determine the type and availability of each receiver destination. At this time, the data type (e.g., dpi and bpp) of each receiver destination is also negotiated, as is the case with existing JetSend™ equipped systems.

If there are any difficulties with establishing a connection or establishing an acceptable data format at point 28 (FIG. 3), the user is made aware of the problem and prompted for any corrections at point 30 (FIG. 3). If the destinations are to be changed, the process returns to point 22 (FIG. 3). If not, the user proceeds to point 34 (FIG. 3), at which the document 36 (FIG. 2) is scanned in a conventional manner.

As shown in FIG. 2, the document 36 can be divided into a plurality of scan segments or strips 38, which are scanned sequentially. As each strip is scanned, image processing is performed at point 40 (FIG. 3) to convert the image from one image type to another. In a preferred embodiment, the image is scanned in as the "greatest common denominator" (e.g., highest resolution) among the types required by the various heterogeneous receivers.

In the illustrated example (FIG. 2), the image processing is accomplished by creating three temporary storage locations or buffers 42, 44, and 46, which may, for example, correspond to processing images for receiver destinations requiring 300 dpi single bpp data, 600-dpi single bpp data, and 300-dpi 8-bpp data, respectively.

After the entire document has been scanned, electronic data files are created at point 48 (FIG. 3). Data files 50, 52, and 54 (FIG. 2) correspond to buffers 42, 44, and 46 (FIG. 2), and contain data in the divergent formats described above.

The data from the respective files 50, 52, and 54 (FIG. 2) is then simultaneously sent to the receiver destinations at point 56 (FIG. 3). The transmission status can be displayed on the touchscreen display 58 (FIG. 2), as indicated at point 60 (FIG. 3). Status can be updated in real time by using a standard query loop with existing JetSend™ technology.

Figure 4:
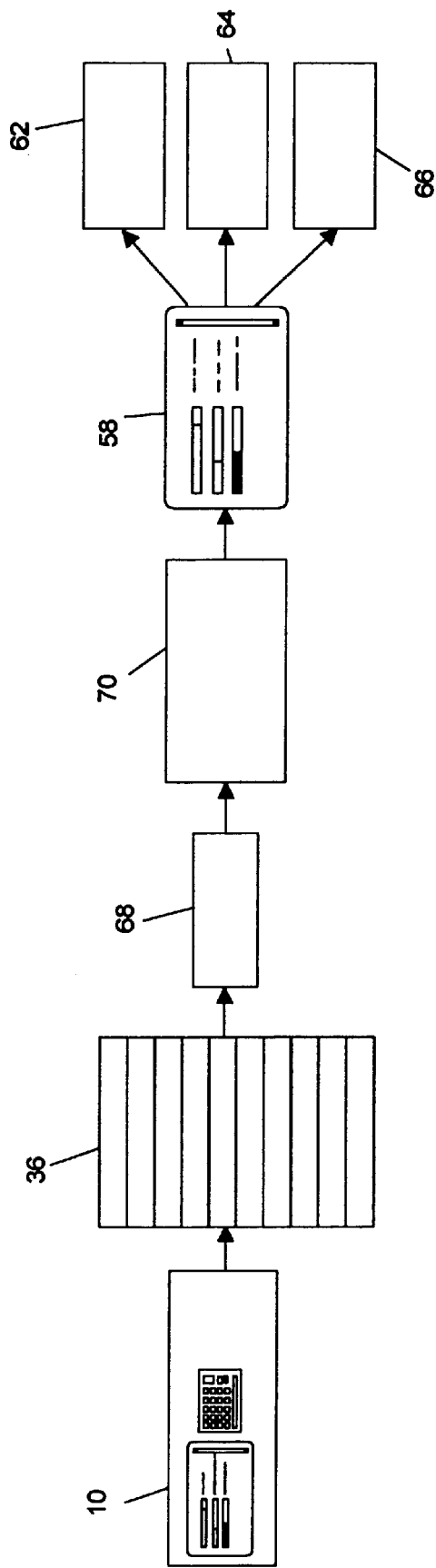
FIG. 4 is a schematic diagram illustrating a method in accordance with the principles discussed herein.

FIG. 4 illustrates another aspect of the present invention, in which the heterogeneous receivers 62, 64, and 66 accept identical electronic data formats, but require different transmission paths. Known devices, such as the 9100C Digital Sender™, can nominally "send" scanned documents to a plurality of e-mail destinations. However, this is accomplished by grouping the addresses as a single transmission, then depending on an external server, to perform the individual transmissions. Furthermore, the 9100C Digital Sender™ is incapable of simultaneous transmission to diverse receivers, such as e-mail addresses and a JetSend™ equipped device, even in those instances where the data format requirements are the same.

As shown in FIG. 4, destination selection at the scanner 10 and actual scanning of the document 36 are performed identically to the method described with reference to FIGS. 2 and 3. As image processing is performed, the scanned image is converted to only one electronic data format. Consequently, image processing is accomplished by creating only one buffer 68, which corresponds to processing images for the selected receiver destinations.

After the entire document has been scanned, a single electronic data file 70 is created, and is then simultaneously sent to the receiver destinations 62, 64, and 66. The transmission status can be updated in real time by using a standard query loop with existing JetSend™ technology, and displayed on the touchscreen display 58 (as in FIG. 2).

The present invention describes the method by which a scanner, such as a Mopier 320 scan-to-host device, can be used to permit a user to scan a single or multi-page document and send the document to multiple heterogeneous receiver destinations. This is achievable since JetSend™ provides status based on each destination, and at regular intervals can be queried to obtain updated status information. This can be done for multiple destinations, since a job i.d. is assigned to each destination, and each destination is tracked as a separate job.

It is contemplated that the present invention will find utility with other data format selection schemes. For example, it may be desirable for reasons of economy to determine the "least common denominator" of data formats acceptable to the receiver destinations, and create a single electronic data file to be sent all destination addresses. While this would eliminate the need to create separate files, it would provide a less-than-desirable document resolution for higher-end receivers. It is therefore apparent that, although the present invention has been described with reference to specific embodiments, those of skill in the art will recognize that changes may be made thereto without departing from the scope and spirit of the invention as defined by the appended claims.

What is claimed is:

1. A method for transmitting data contained in a document between a scanning device and a plurality of heterogeneous receiver destinations, each respective receiver destination being capable of receiving scanned information in a specific data form, the method comprising the following steps:

selecting a plurality of heterogeneous receiver destinations;

determining an acceptable data form for each receiver destination;

scanning the document once to convert the document into electronic data;

using the electronic data to create a respective electronic data file for each receiver destination, each file being converted to a data form appropriate to its corresponding receiver destination; and transmitting the electronic data files to their respective receiver destinations.

2. A method according to claim 1, wherein the step of using the electronic data further comprises creating a buffer as an intermediate step in creating the respective data files.

3. A method according to claim 2, further comprising the step of assigning a job number to each receiver destination selected.

4. A method according to claim 3, further comprising the step of displaying transmission status for each of the job numbers.

5. A method according to claim 1, further comprising the step of communicating with each receiver destination to determine the type and availability of each receiver destination.

6. A method according to claim 1, wherein the step of selecting a plurality of heterogeneous receiver destinations comprises selecting at least one receiver destination of at least two types chosen from a group consisting of a host workstation, a fax machine, a server, an e-mail server, and a JetSend™ receiver.

7. In a system including a scanning device connected to a plurality of heterogeneous receiver destinations capable of receiving scanned information as electronic files, a method for transmitting data contained in a document, the method comprising the following steps:

selecting a plurality receiver destinations;

assigning a job number to each receiver destination selected;

scanning a document with the scanning device;

converting the document into a plurality of electronic files of varying data types; and transmitting the electronic file from the scanning device to the selected receiver destinations.

8. A method according to claim 7, wherein the step of scanning further comprises dividing document into plurality of strips, and scanning the strips sequentially.

9. A method according to claim 8, wherein the step of converting further comprises creating a buffer file to receive scanned data for each file type.

10. A method according to claim 9, wherein the step of converting further comprises using the buffer files to create data create files after the scanning step is completed.

11. A method according to claim 7, wherein the step of converting comprises converting the document into a plurality of electronic files having different resolutions.

12. A method according to claim 7, further comprising the step of displaying transmission status during the step of transmitting.

13. A method according to claim 12, further comprising the following steps:

querying at regular intervals each job number to obtain updated status information while transmitting the electronic file to the at least one selected receiver destination; and displaying updated transmission status of the electronic file while transmitting the electronic file to the selected receiver destinations.

14. A method according to claim 12, wherein the step of selecting comprises the following steps:

providing, in the scanning device, a memory device containing a plurality receiver destination addresses;

displaying a list of the receiver destination addresses stored in the memory device; and selecting a plurality of heterogeneous receiver destinations from the displayed list.

15. In a system including a scanning device connected to at least one receiver capable of receiving scanned information as electronic files, a scanning device transmission arrangement comprising the following:

processor means for storing, retrieving, and selecting a plurality of heterogeneous receiver destinations;

scanning means for converting a document into electronic data; and communication means for establishing contact with a selected plurality of heterogeneous receiver destinations and for transmitting data created from a scanned document to the selected plurality of heterogeneous receiver destinations simultaneously.

16. A scanning device transmission arrangement according to claim 15, wherein the communications means comprises a network connection.

17. A scanning device transmission arrangement according to claim 15, further comprising display means for displaying system status information.

18. A scanning device transmission arrangement according to claim 15, further comprising input means for entering receiver destination addresses into the processor means.

19. A scanning device transmission arrangement according to claim 15, wherein the processor means further comprises tracking means for assigning a job number to each receiver destination address.

20. A scanning device transmission arrangement according to claim 15, wherein the processor means further comprises archive means for storing job log information.

\* \* \* \* \*